United States Patent
Blasig et al.

(10) Patent No.: US 9,411,920 B2
(45) Date of Patent: Aug. 9, 2016

(54) SPECIFYING AND IMPLEMENTING RELATIVE HARDWARE CLOCKING IN A HIGH LEVEL PROGRAMMING LANGUAGE

(71) Applicant: NATIONAL INSTRUMENTS CORPORATION, Austin, TX (US)

(72) Inventors: Dustyn K. Blasig, Pflugerville, TX (US); Newton G. Petersen, Austin, TX (US); Matthew E. Novacek, Austin, TX (US); Julian G. Valdez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 248 days.

(21) Appl. No.: 14/107,476

(22) Filed: Dec. 16, 2013

(65) Prior Publication Data

US 2014/0344614 A1    Nov. 20, 2014

Related U.S. Application Data

(60) Provisional application No. 61/823,059, filed on May 14, 2013.

(51) Int. Cl.
*G06F 17/50* (2006.01)

(52) U.S. Cl.
CPC ........ *G06F 17/5059* (2013.01); *G06F 17/5031* (2013.01); *G06F 2217/62* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 5,911,083 A | * | 6/1999 | Kuslak | G06F 5/06 712/41 |
| 2007/0277052 A1 | * | 11/2007 | Sargaison | G06F 1/12 713/400 |
| 2009/0182987 A1 | * | 7/2009 | Mejdrich | G06F 1/3203 712/215 |
| 2011/0138393 A1 | * | 6/2011 | Venkumahanti | G01R 1/07378 718/104 |
| 2011/0239220 A1 | * | 9/2011 | Gibson | G06F 1/3206 718/103 |
| 2012/0030600 A1 | * | 2/2012 | Chandhoke | G06F 1/12 715/771 |
| 2013/0124826 A1 | * | 5/2013 | Merchant | G06F 9/3851 712/205 |
| 2014/0075235 A1 | * | 3/2014 | Chandhoke | H04J 3/0667 713/401 |
| 2014/0101347 A1 | * | 4/2014 | Chandhoke | G06F 13/404 710/26 |
| 2014/0344614 A1 | * | 11/2014 | Blasig | G06F 17/50 713/501 |

OTHER PUBLICATIONS

Luis F. G. Sarmenta, Gill A. Pratt, and Stephen A. Ward; "Rational Clocking"; Proceedings of the International Conference on Computer Design; Oct. 1995; 8 pages.
Silicon Labs, "Traditional Multi-Rate Clock Solutions", The Best of Tech, Feb. 18, 2013, 3 pages.

* cited by examiner

*Primary Examiner* — Isaac T Tecklu
(74) *Attorney, Agent, or Firm* — Meyertons Hood Kivlin Kowert & Goetzel, P.C.; Jeffrey C. Hood; Mark S. Williams

(57) ABSTRACT

System and method for specifying and implementing relative hardware clocking in a high level programming language. User input specifying a program may be received. The program is specified for deployment to a programmable hardware element (PHE), and includes first and second code portions configured to communicate with each other during execution. The user input may further specify a rational ratio of respective execution rates for the first and second code portions. A hardware configuration program (HCP) implementing the specified program is automatically generated, including automatically determining a respective clock rate for at least one of the first and second code portions based on the rational ratio. The HCP may be deployable to the PHE, including implementing first and second clocks for controlling execution of the first and second code portions in accordance with the rational ratio and the automatically determined respective clock rate for the at least one code portion.

20 Claims, 13 Drawing Sheets

SPECIFYING AND IMPLEMENTING RELATIVE HARDWARE CLOCKING IN A HIGH LEVEL PROGRAMMING LANGUAGE

PRIORITY DATA

This application claims benefit of priority to U.S. Provisional Application Ser. No. 61/823,059, titled "Specifying and Implementing Relative Hardware Clocking in a High Level Programming Language", filed May 14, 2013, whose inventors were Dustyn K. Blasig, Newton G. Petersen, Matthew E. Novacek, and Julian G. Valdez, which is hereby incorporated by reference in its entirety as though fully and completely set forth herein.

FIELD OF THE INVENTION

The present invention relates to the field of programming, and more particularly to systems and methods for specifying and implementing relative hardware clocking in a high level programming language.

DESCRIPTION OF THE RELATED ART

When designing an application, e.g., for implementation in hardware, it is often the case that tradeoffs can be made between utilizing more resources to complete a task and trying to reuse resources in a manner that maintains desired performance while requiring fewer of the constrained resources. Some platforms, such as field programmable gate arrays (FPGAs) have hardware support for executing various parts of an application at different speeds. For example, one part of an application targeted to an FPGA may clock registers (state holding memory elements) at 120 MHz while another part may clock registers at 40 MHz.

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

However, prior art programming tools and approaches, whether using high level textual or graphical programming languages, do not provide convenient and flexible means for specification and support of relatively timed code in programs specified for deployment to programmable hardware, particularly when one or more execution clock rates are unspecified.

SUMMARY OF THE INVENTION

Various embodiments of a system and method for specifying and implementing relative hardware clocking in a high level programming language are presented below.

First, user input specifying a program may be received, where the program is specified for deployment to a programmable hardware element. The program may include a first code portion and a second code portion, where the first code portion and the second code portion are configured to communicate with each other during execution. The user input specifying the program may further specify a rational ratio of respective execution rates for the first code portion and the second code portion.

For example, the graphical program may be created or assembled by the user arranging on a display a plurality of nodes or icons and then interconnecting the nodes to create the graphical program (via the above user input). In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

A hardware configuration program implementing the specified program may automatically be generated, including automatically determining a respective clock rate for at least one of the first code portion or the second code portion based at least in part on the specified rational ratio of respective execution rates for the first code portion and the second code portion. The hardware configuration program may be deployable to the programmable hardware element, including implementing first and second clocks for controlling execution of the first code portion and the second code portion in accordance with the specified rational ratio and the automatically determined respective clock rate for the at least one of the first code portion or the second code portion. In other words, once the programmable hardware element is configured with the hardware configuration program, the programmable hardware element is configured to execute the specified functionality of the first and second code portions per the implemented first and second clocks in accordance with the specified rational ratio and the determined respective clock rate for the at least one of the first code portion or the second code portion.

In one embodiment, the method may further include deploying the hardware configuration program to the programmable hardware element, thereby implementing the first and second clocks for controlling execution of the first code portion and the second code portion in accordance with the specified rational ratio and the automatically determined respective clock rate for the at least one of the first code portion or the second code portion. For example, the program development environment, and/or a software tool used separately or in conjunction with the program development environment, may compile or otherwise transform or convert the program source code to a hardware configuration program (HCP), possible via one or more intermediate forms, e.g., a data flow intermediate representation (DFIR), other programming languages, etc., as desired.

BRIEF DESCRIPTION OF THE DRAWINGS

A better understanding of the present invention can be obtained when the following detailed description of the preferred embodiment is considered in conjunction with the following drawings, in which.

Figure 1A:
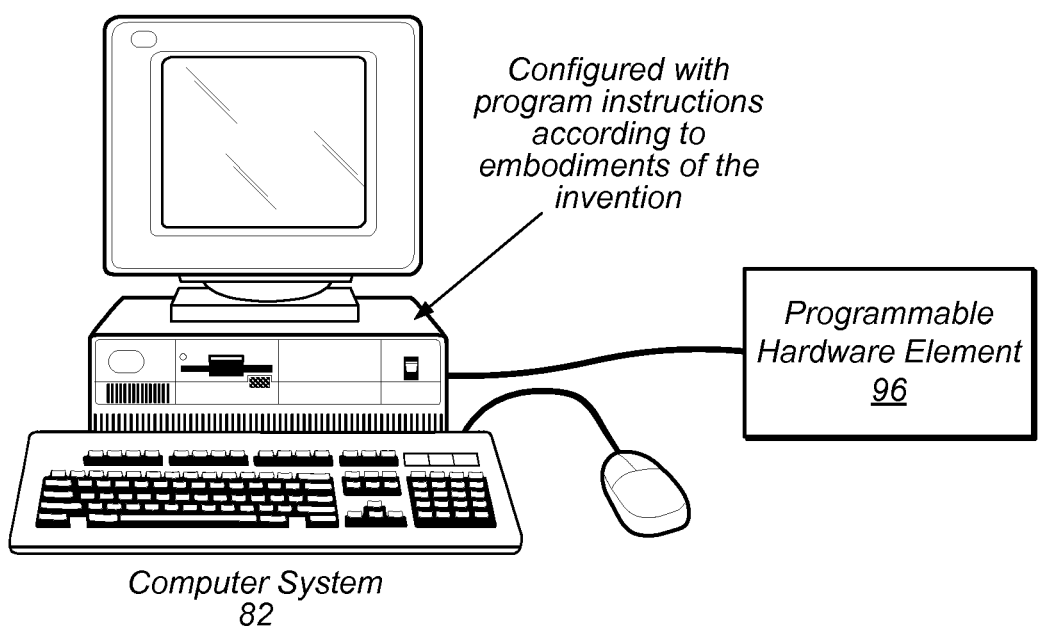
FIG. 1A illustrates a computer system configured to implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/823,059, titled "Specifying and Implementing Relative Hardware Clocking in a High Level Programming Language", filed May 14, 2013.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Overview

When designing an application, it is often the case that tradeoffs can be made between utilizing more resources to complete a task and trying to reuse resources in a manner that maintains the appropriate performance while requiring fewer of the constrained resources. Some platforms, such as field programmable gate arrays (FPGAs) have hardware support for running various parts of an application at different speeds. For instance, one part of an application targeted to an FPGA can clock registers (state holding elements) at 120 MHz while another part could clock registers at 40 MHz.

Embodiments of the techniques disclosed herein may provide a software interface that allows a person to describe or specify the intent of running parts of their application at different rates, and further, may provide for automatic inference of application parts that may benefit from relatively timed code.

The use of fewer resources by sharing them between multiple clients at different times instead of at different locations in space (duplication of resources) is known in some application domains as time multiplexing. It should be noted that many of the examples described below are in terms of the LabVIEW™ graphical programming language (G), but the concepts described are also applicable to other programming language forms as well, including textual languages. Some examples are shown in multiple forms for clarity.

FIG. 1A—Computer System

FIG. 1A illustrates a computer system 82 configured to implement embodiments of the present invention. One embodiment of a method for specifying and implementing relative hardware clocking in a high level programming language is described below, e.g., for a program specified for deployment to hardware. As may be seen, in the exemplary system of FIG. 1A, the computer system 82 is coupled to programmable hardware, specifically, a programmable hardware element 96, such as a field programmable gate array (FPGA).

As shown in FIG. 1A, the computer system 82 may include a display device configured to display the program as the program is created and/or executed. In some embodiments where the program is a graphical program, the display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs (e.g., graphical programs) which are executable to perform the methods described herein. Additionally, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

Figure 1B:
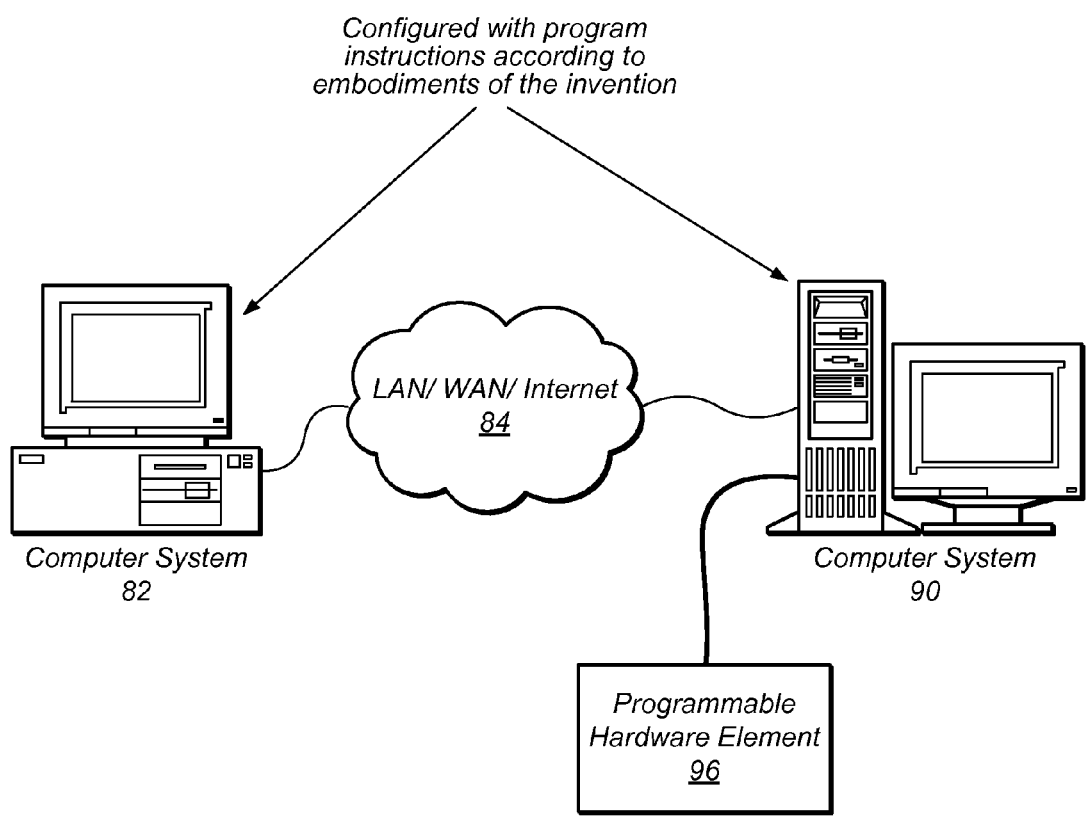
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, in some embodiments where the program is a graphical program, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the program may be displayed on a display device of the computer system 82, and the code body, e.g., block diagram, may execute on a device coupled to the computer system 82. The device may include a programmable hardware element 96, and/or may include a processor and memory medium which may execute a real time operating system. In one embodiment, the program may be downloaded and executed on the device. For example, an application development environment with which the program is associated may provide support for downloading the program for execution on the device in a real time system. In other words, the application development environment may be configured to deploy the program to hardware, e.g., by converting the program to a hardware configuration program, then configuring the hardware with the hardware configuration program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
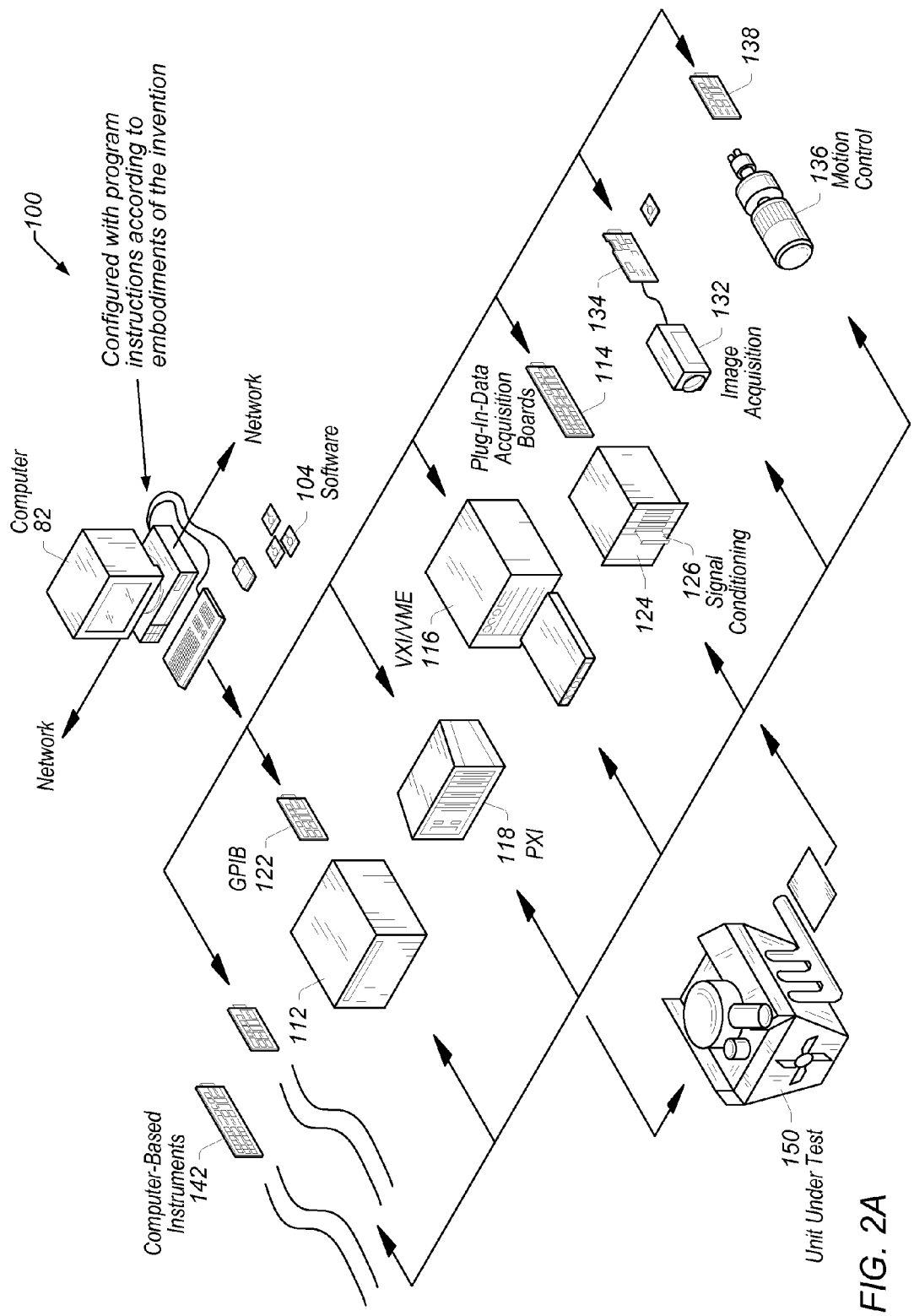
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
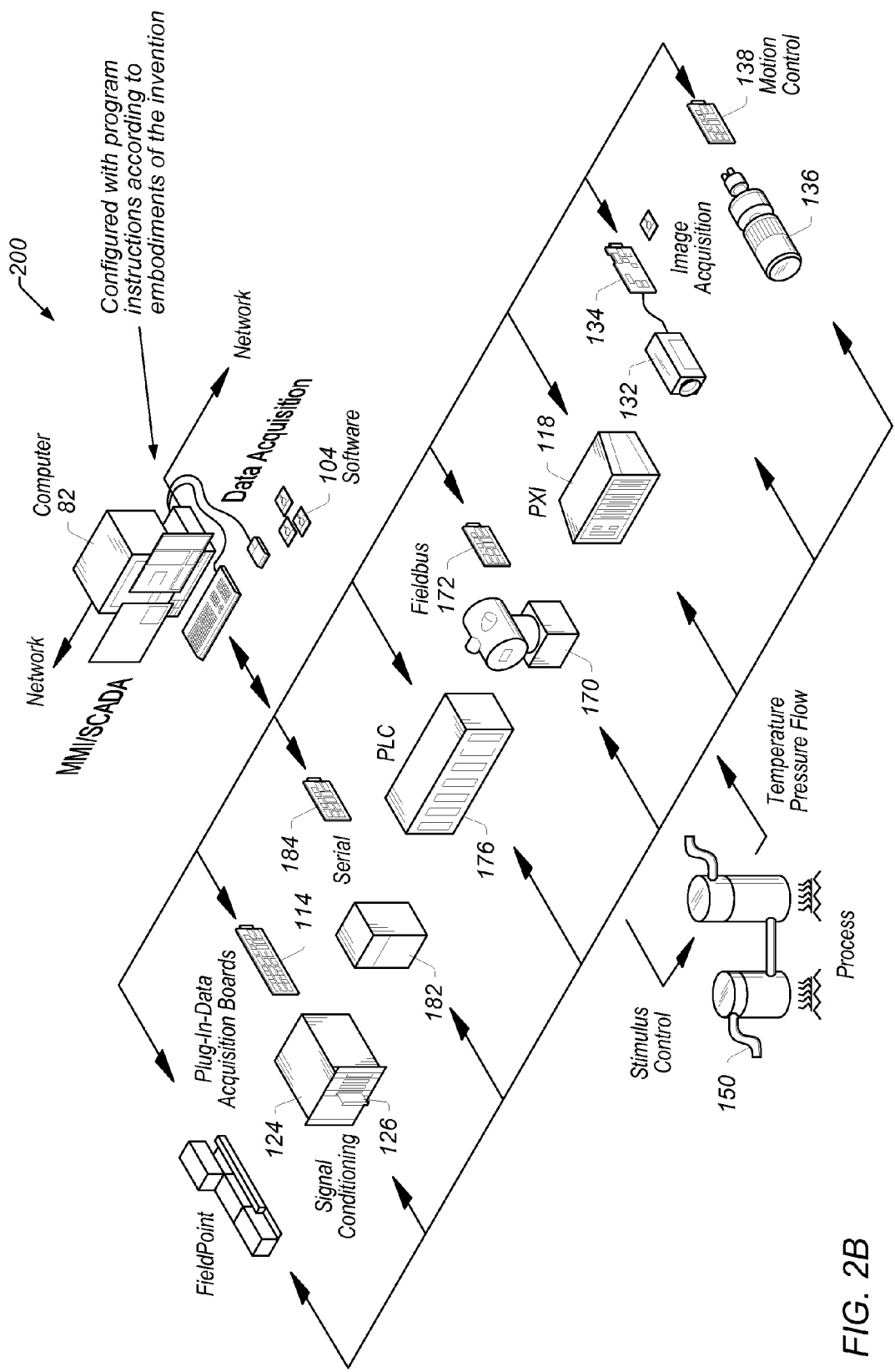
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system 185, available from National Instruments, among other types of devices.

Figure 3A:
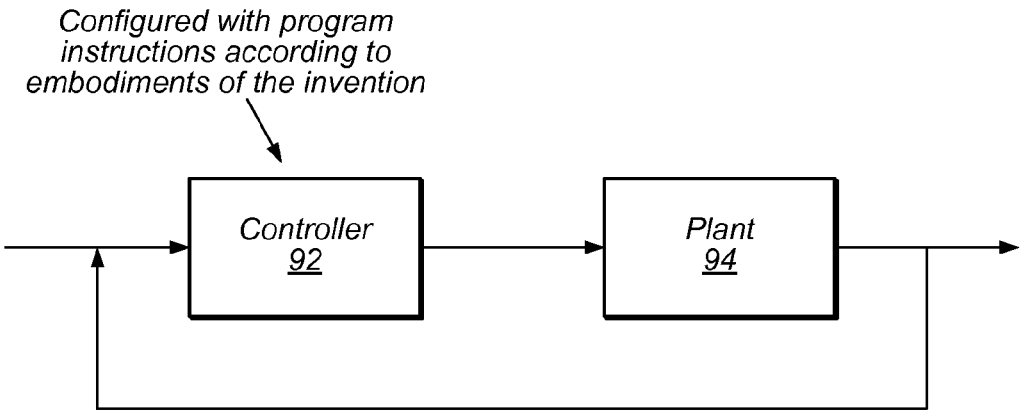
FIG. 3A is a high level block diagram of an exemplary system which may execute or utilize graphical programs.

FIG. 3A is a high level block diagram of an exemplary system which may execute or utilize programs, e.g., graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, such as a graphical (or textual) program that specifies or implements the functionality of one or both of the controller 92 and the plant 94. For example, a control engineer may use a modeling and simulation tool to create a model (graphical program) of the plant 94 and/or to create the algorithm (e.g., graphical program) for the controller 92.

Figure 3B:
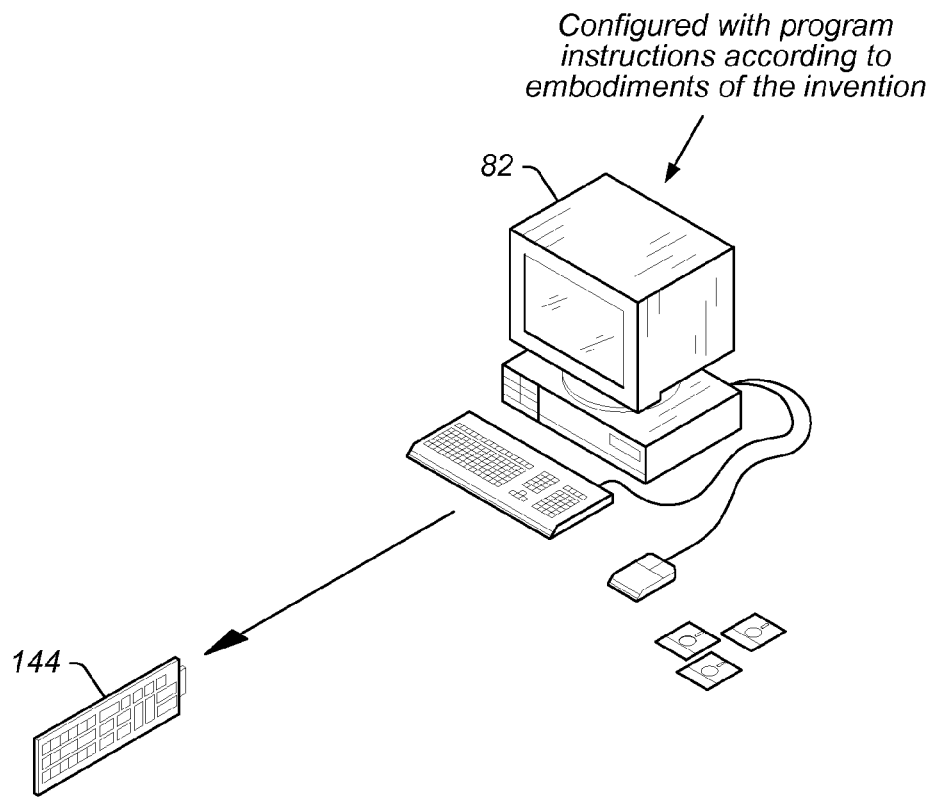
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a (possibly graphical) program. In a similar manner, the plant 94 may be implemented by a computer system or other device 144 (e.g., including a processor and memory medium and/or a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
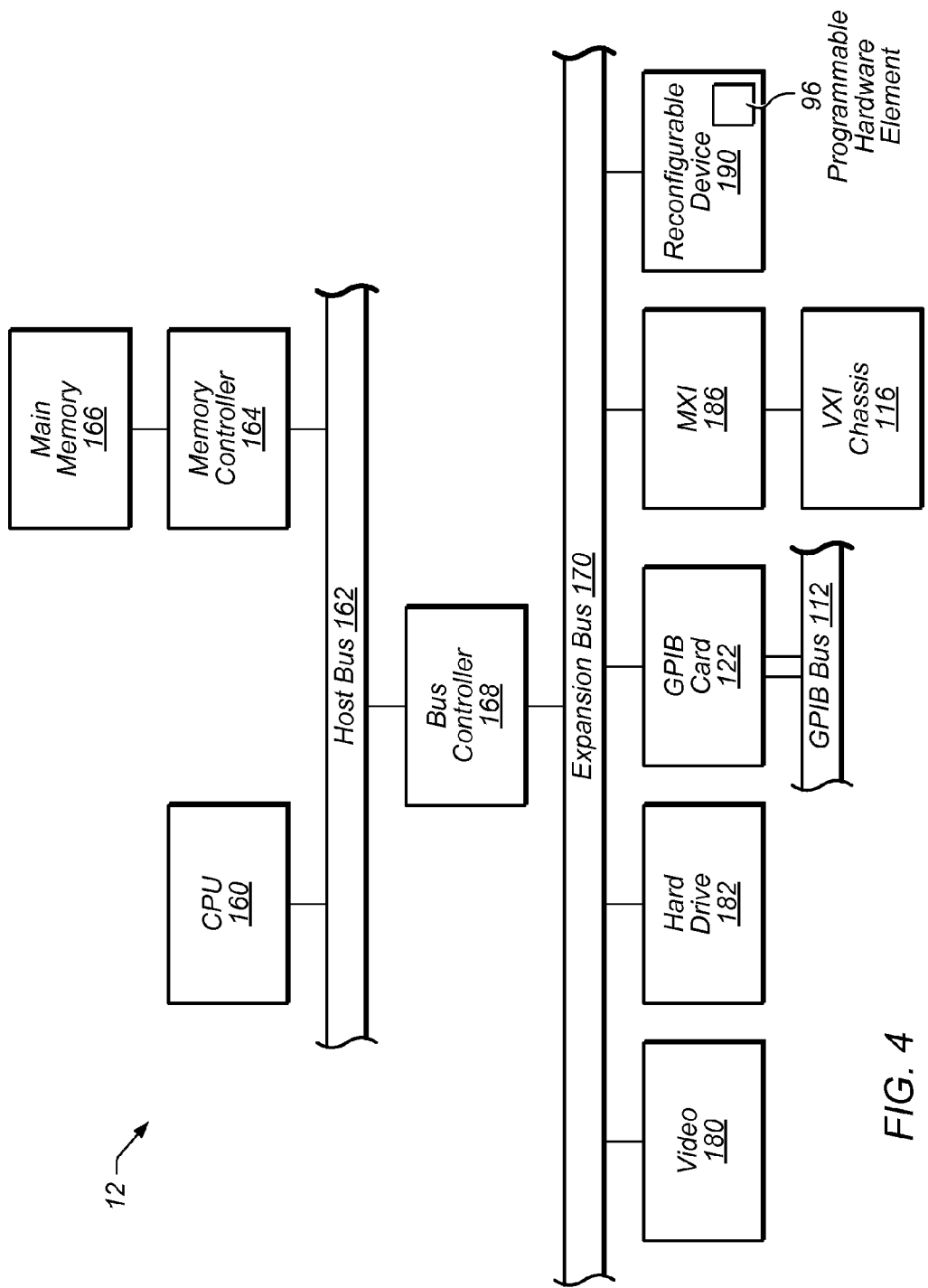
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIGS. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs configured to implement embodiments of the present invention, as well as programs generated thereby. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element 96. The computer system may be configured to deploy a program to the device 190 for execution of the program on the device 190. The deployed program may take the form of textual code, or in embodiments where the program is a graphical program, graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Whether textual or graphical, a hardware configuration program may be generated based on the program, where the hardware configuration program is deployable to the programmable hardware element 96. Thus, in various embodiments, the program may be a textual program in one or more textual programming languages such as, for example, C, C++, JAVA, FORTRAN, etc., or may be a graphical program, e.g., a graphical data flow program, such as a LabVIEW™ program, per a LabVIEW graphical program development environment provided by National Instruments Corporation.

Figure 5:
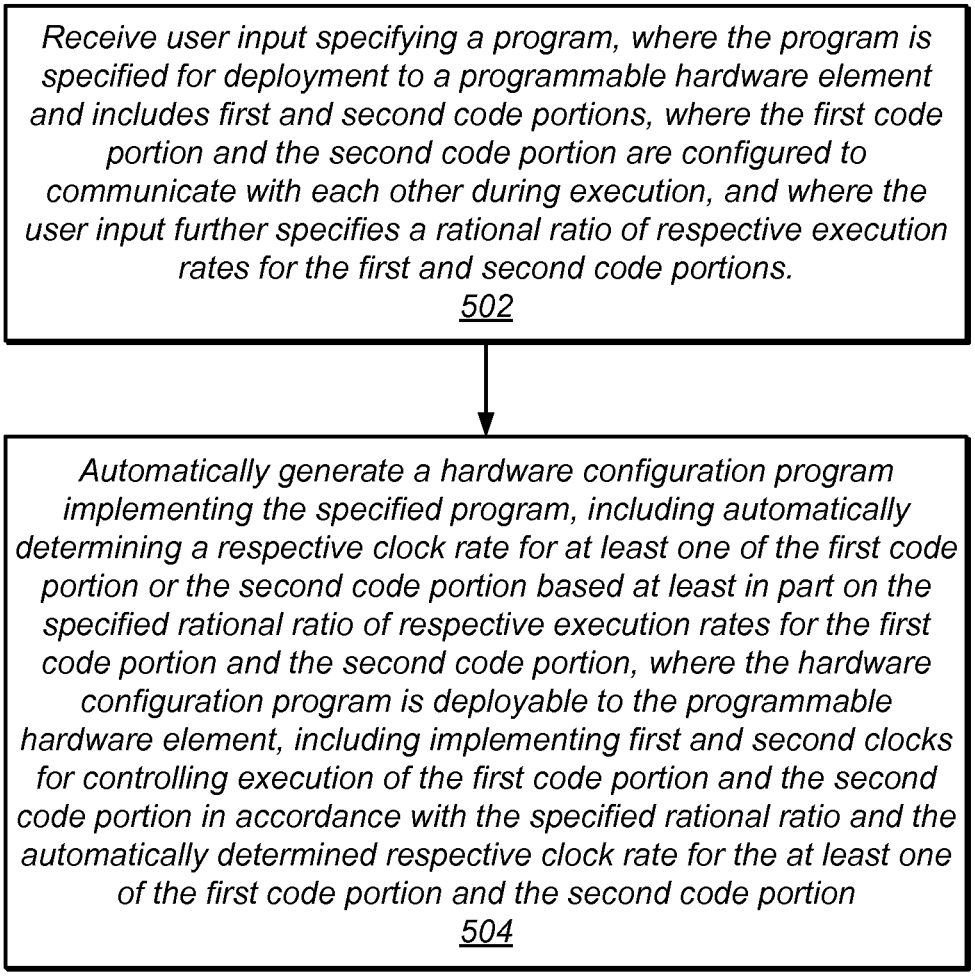
FIG. 5 is a flowchart diagram illustrating one embodiment of a method for specifying and implementing relative hardware clocking in a high level programming language.

FIG. 5—Flowchart of a Method for Specifying and Implementing Relative Hardware Clocking in a High Level Programming Language FIG. 5 illustrates a method for specifying and implementing relative hardware clocking in a high level programming language, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, user input specifying a program may be received, where the program is specified for deployment to a programmable hardware element. The program may include a first code portion and a second code portion, where the first code portion and the second code portion are configured to communicate with each other during execution. The user input specifying the program may further specify a rational ratio of respective execution rates for the first code portion and the second code portion.

For example, the graphical program may be created or assembled by the user arranging on a display a plurality of nodes or icons and then interconnecting the nodes to create the graphical program (via the above user input). In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In 504, a hardware configuration program implementing the specified program may automatically be generated, including automatically determining a respective clock rate for at least one of the first code portion or the second code portion based at least in part on the specified rational ratio of respective execution rates for the first code portion and the second code portion. The hardware configuration program may be deployable to the programmable hardware element, including implementing first and second clocks for controlling execution of the first code portion and the second code portion in accordance with the specified rational ratio and the automatically determined respective clock rate for the at least one of the first code portion or the second code portion. In other words, once the programmable hardware element is configured with the hardware configuration program, the programmable hardware element is configured to execute the specified functionality of the first and second code portions per the implemented first and second clocks in accordance with the specified rational ratio and the determined respective clock rate for the at least one of the first code portion or the second code portion.

Exemplary Embodiments

The following describes various further embodiments of the above techniques, although it should be noted that the embodiments described are exemplary only, and do not limit the embodiments contemplated to any particular form, function, or appearance.

Various embodiments of the techniques disclosed herein may provide for executing a section of program code faster or slower than the program code that surrounds it.

In some embodiments, the method may utilize a combination of techniques to achieve the desired rational ratio of execution rates for the first and second code portions. A classic approach to completing code execution in fewer time steps is to run multiple code paths concurrently or in parallel. Thus, for example, in addition to setting respective clock rates, the method may implement various levels of parallelism of the program code, where respective parts or functionality of the program are targeted for concurrent execution on the programmable hardware element. For example, assuming that some iterations of a program loop (and execution of code contained therein) are independent of one another, these iterations may be separated into separate and distinct parts and implemented as concurrent program code. The following graphical and textual programs show a hypothetical but characteristic code block that demonstrates this form.

Parallelism or concurrency may be implemented in response to special indicators placed in the source code. Consider, for example, the following exemplary textual code:

00: arrays a[ ], b[ ], c[ ]
01: for (i=0; i<a.size; ++i)
02: c[i]=a[i]+b[i]

As may be seen, this code iterates through the elements of array a[ ], adding each element to a corresponding element from array b[ ], and placing the result in array c[ ]. In other words, in this example, the sum of the corresponding elements within arrays a and b are stored into the corresponding element of array c. If each execution of program line 02 takes one time step, the total time to execute this application would be a number of time steps equal to the size of the arrays. One common way to decrease the number of time steps necessary to execute this example is to use more logic resources within one time step and compute multiple values at one time. An equivalent program after such a rewrite might look something like the following, where the code has been parallelized via the exemplary directive "in parallel", which is a qualification to the loop body that denotes that the lines of code within the loop are to be executed concurrently:

00: arrays a[ ], b[ ], c[ ]
01: for (i=0; i<a.size; i+=2) in parallel
02: c[i]=a[i]+b[i]
03: c[i+1]=a[i+1]+b[i+1]

where statements 00116 and 00117 operate or execute concurrently. Note that such parallelization may require the hardware to use two addition resources to complete each iteration of the loop within a single time step. In many cases, the additional required resources are not available and therefore cannot be used to complete the application in a shorter number of time steps.

Figure 6:
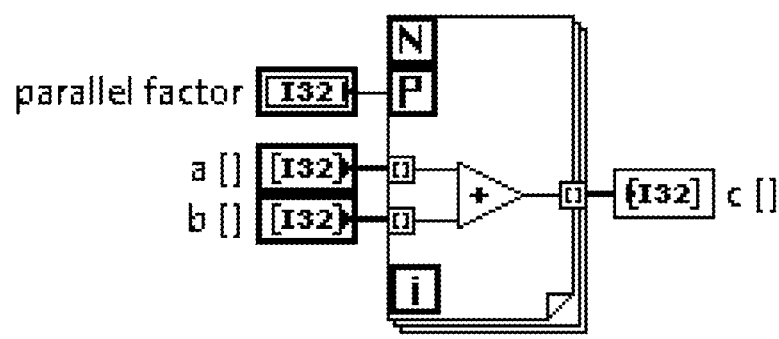
FIG. 6 illustrates a parallelization directive for an exemplary graphical code portion, according to one embodiment.

FIG. 6 illustrates a corresponding exemplary implementation of the above array processing code in a graphical (LabVIEW™) program, where the LabVIEW parallel loop feature provides this functionality. As shown, in addition to the array inputs, there is a "parallel factor" (32 bit integer) provided that specifies the degree of parallelism desired. In accordance with this directive, the method (e.g., a compiler) may "unroll" at least some of the iterations, and implement the functionality in parallel, where "unroll" refers to extracting one or more iterations of the contained program code (or functional equivalent) for implementation or execution outside the original iteration structure (loop).

Application constraints cannot always be met by parallelization and cloning of resources. For example, parallelization of an application may require more resources than available in the system, e.g., resources/room on the FPGA. In addition, the application design may inherently be non-parallelizable; this generally occurs if the design includes feedback or state within iterative structures.

In these scenarios, the design constraints may be met by decreasing the length of a time step for a portion of the application therefore shortening the overall runtime. A common term for this technique is "overclocking". Other similar techniques include time and resource multiplexing. Overclocking may allow fewer constrained resources to be used within the faster rate (overclocked) code by pushing more data through the same logic in smaller time steps (decreased period).

In an FPGA, overclocking may be achieved by running (or clocking) a subset of the design at a higher clock rate than the surrounding logic. Other systems may accomplish this by temporarily overclocking their command pipeline or other similar techniques. Revisiting the above example, in some embodiments, the definition or specification of the loop structure may be extended to include specification of overclocking factors. These factors may be defined by the user in at least the following ways (but are not limited to these ways).

Figure 10:
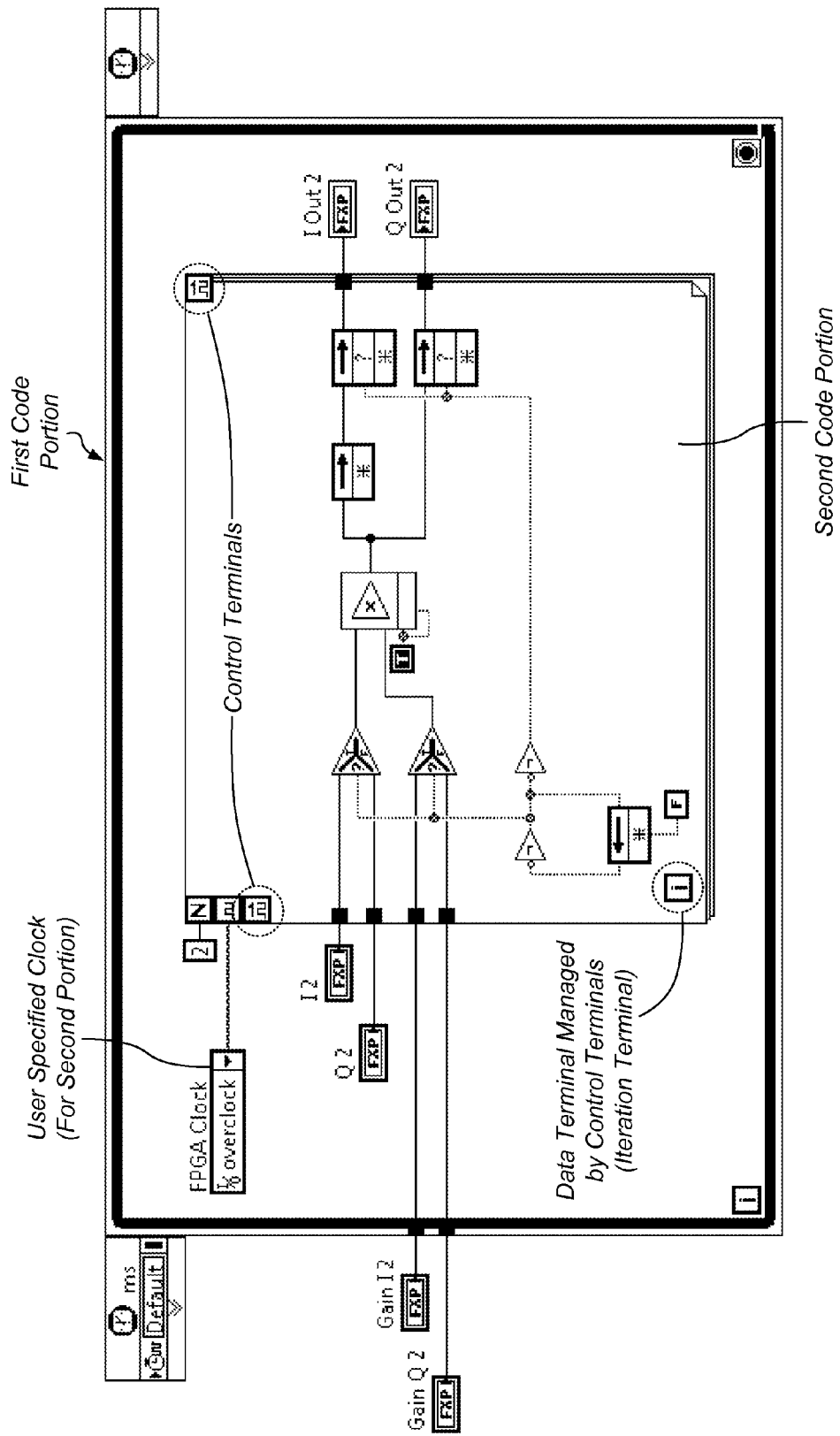
FIG. 10 illustrates an exemplary graphical program where the second code portion includes control terminals, according to one embodiment.

Direct Specification of the Faster Clock: The user specifies the exact clock (or clock rate) to be used for execution of the loop structure. For example, if the user specifies a clock that is four times faster, the iteration period may be decreased by a factor of four. FIG. 10, discussed below, illustrates an exemplary case where the user has specified "FPGA Clock" for the second code portion, and a default FPGA value may be specified accordingly. In one embodiment, the compiler may detect configurations that are incompatible and report them to the user.

Rate Denoted by Loop Iterations: If the time period for the logic surrounding the loop structure is known, the compiler may infer the necessary rate for the loop structure by generating or using a clock whose rate along with the number of iterations of the structure can complete within one period of the surrounding logic. FIG. 10, discussed below, shows an exemplary FOR loop with a specified number of iterations of 2, and so the code contained therein is specified to execute twice for each period of the surrounding code. Similarly, referring again to FIG. 6, a FOR loop configured to iterate 4 times each time it is called may thus implicitly specify a ratio of 1/4 (i.e., 1:4), where the code inside the FOR loop executes 4 times for each time the surrounding (calling) code executes. In other words, if the array size were 4 and the value of the number of iterations to be performed, N, were 4, and the parallel factor, P, were 1, this would implicitly specify a rational ratio of 1/4 (1:4).

In one embodiment, a tool, such as LabVIEW™ and/or LabVIEW FPGA™ Module, may utilize timing and resource estimates, and possibly many other data points, to guide the tool in automatically inferring appropriate settings for the user. Further, in some embodiments, the compiler may iterate on the design automatically to explore the design space and further optimize the parameters to meet higher-level criteria like quality of results.

For example, consider a case where a loop structure is required to execute four iterations within a single iteration of the surrounding logic. The compiler may choose to fully unroll the loop structure for concurrent execution (parallel), or fully overclock the structure to iterate quickly enough to meet the performance requirement (serial). In some embodiments, the compiler (or more generally, the tool) may choose to partially unroll and overclock, e.g., where the loop is unrolled into two parts and then each part is overclocked by a factor of two. If the clock rate of the surrounding logic is 100 MHz, then the clock rate of the loop structure would be 400 MHz in the fully overclocked design, whereas 200 MHz is sufficient in the partially overclocked case.

Figure 7:
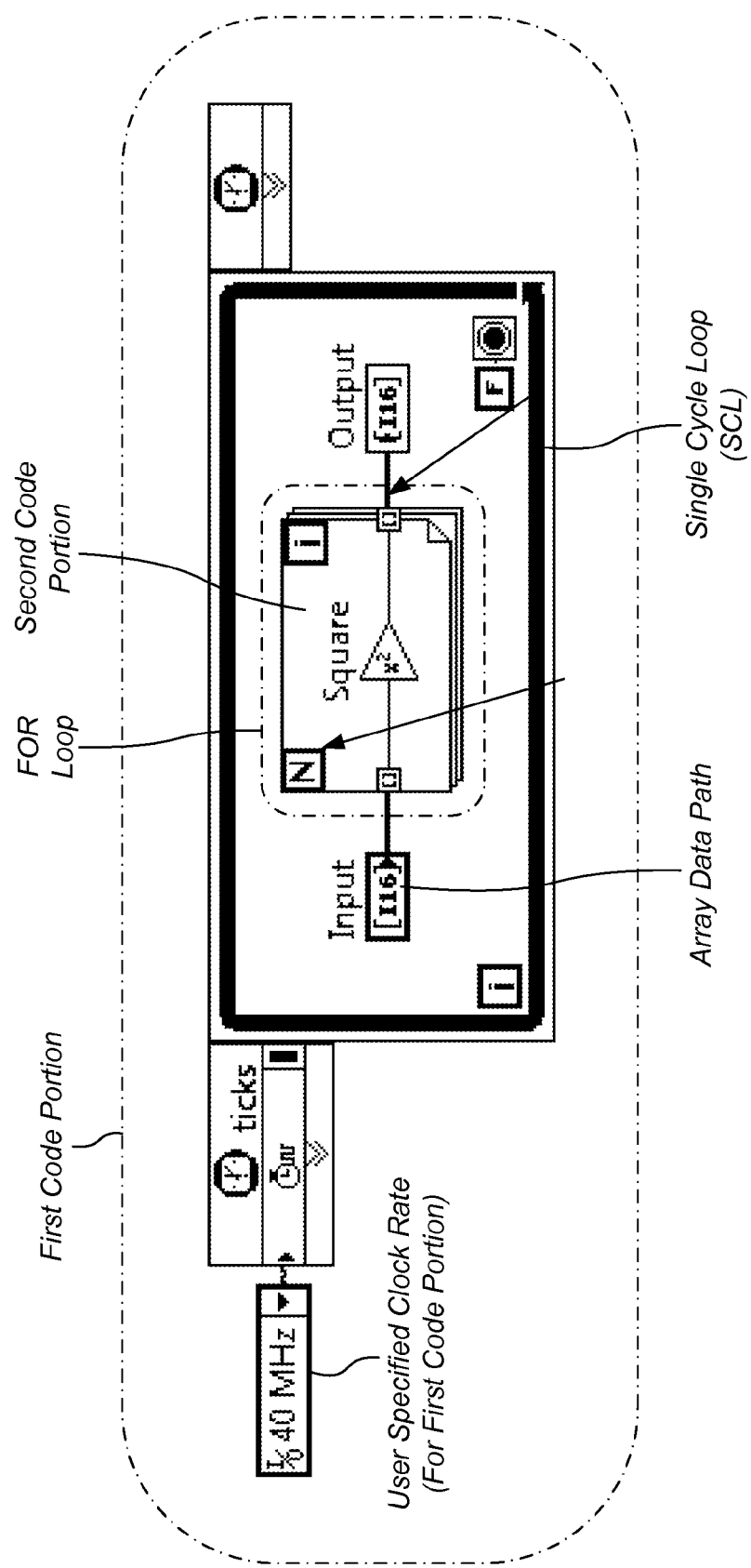
FIG. 7 illustrates an exemplary block diagram in which serialization with decreased time step is used to meet relative hardware clocking requirements, according to one embodiment.

FIG. 7 illustrates an exemplary graphical program with respective first and second code portions, as shown, where the graphical program includes a FOR loop, so labeled, with an array data path for providing input to a "square" function node, executable to compute the square of an input value. In this particular embodiment, a decreased time step is utilized to meet performance requirements. More specifically, this figure shows a FOR loop within a Single-Cycle Loop (SCL) As may be seen, in this embodiment, the second code portion is contained within the FOR loop, and the first code portion is everything else, i.e., the surrounding and containing code. Thus, in this embodiment, the second code portion is contained within the first code portion. The SCL is configured by the user to operate at 40 MHz. The FOR loop may be required to iterate N iterations of the contained program code (diagram) for every invocation of the FOR loop itself. In other words, for each execution of the diagram of the SCL, the diagram of the contained FOR Loop may execute N times. To save resources, the compiler may choose to run the diagram of the FOR loop at a faster clock rate than the 40 MHz clock of the contained code. In a fully overclocked scenario, the FOR loop diagram may operate at a clock rate of 40 MHz*N, allowing complete sharing of the code within the FOR loop.

Accordingly, in some embodiments, the rational ratio of respective execution rates for the first code portion and the second code portion may be less than 1, and, as this example further shows, the execution rate for the second code portion may be an integer multiple of the execution rate for the first code portion.

It should be noted that containment of the second code portion by the first code portion doesn't necessarily require a containing structure, such as the FOR loop of FIG. 7, a case structure, etc. For example, the second code portion may simply be surrounded by the first code portion regarding their I/O relationship, e.g., the first code portion may provide input to the second code portion, and the second code portion may provide output to the first code portion.

Moreover, in one embodiment, the user input may further specify a respective clock rate for one of the first code portion or the second code portion, where automatically determining a clock rate for at least one of the first code portion or the second code portion includes determining that the user-specified clock rate is incompatible with loop semantics of the loop, e.g., the specified rate and the loop iteration rate, and thus execution rate of code contained therein, are not compatible or feasible. The method may then include determining a respective clock rate for the other of the first code portion or the second code portion, where the respective clock rate for the other of the first code portion or the second code portion is compatible with the loop semantics of the loop. As FIG. 7 also shows, in this exemplary embodiment, the user has explicitly specified a clock rate for the first code portion, specifically, 40 MHz. Now, if the method determined that this clock rate is incompatible with the loop semantics, the method may determine a clock rate for the second code portion that renders them compatible. For example, the second clock rate may be increased to a value that is consonant or compatible with the 40 MHz rate of the first code portion.

Alternatively, the compiler may choose to partially parallelize the FOR loop by splitting the FOR loop into two FOR loop each operating N/2 iterations, and then clocking those loops at 40 MHz*N/2. In some embodiments, the compiler may choose to implement embodiments anywhere along this spectrum of overclocking and parallelization (unrolling), depending, for example, on constraints for the application.

Conversely, in some embodiments, the method may use serialization with increased time step to meet relative hardware clocking requirements. For example, if the results of a set of logic (e.g., the second code portion) are only required every few iterations of the surrounding logic, the structure logic may be underclocked. This is similar to overclocking except the surrounding logic (e.g., the first code portion) runs faster than the logic block of the second code portion itself.

Figure 8:
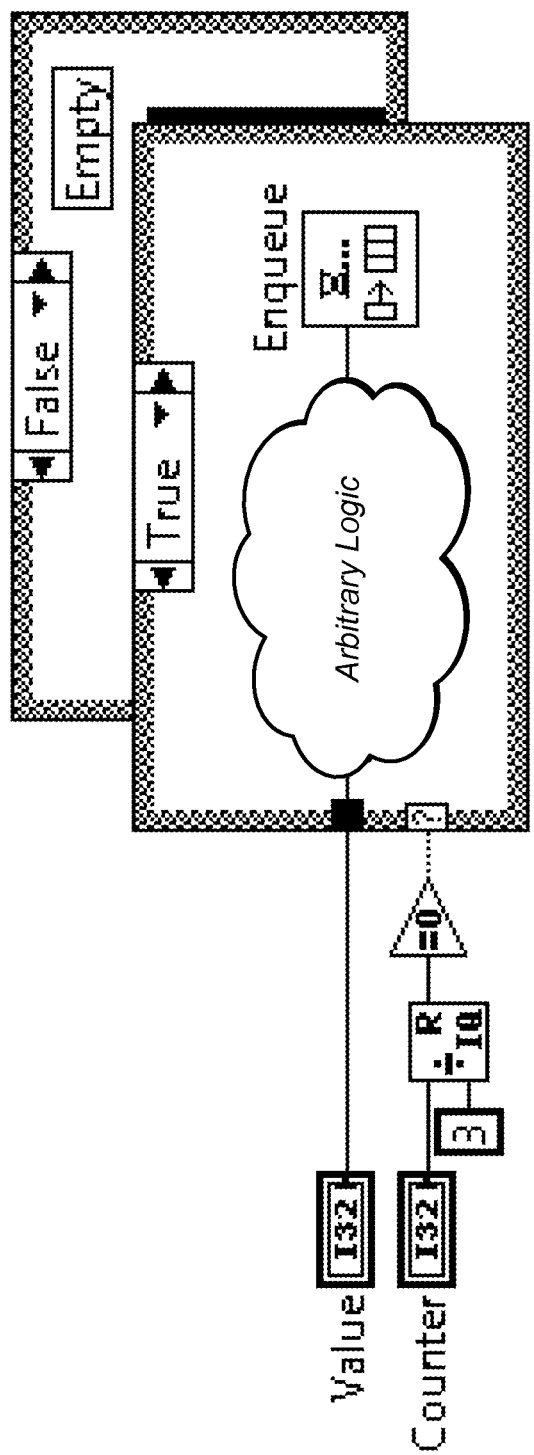
FIG. 8 illustrates an exemplary block diagram in which serialization with increased time step is used to meet relative hardware clocking requirements, according to one embodiment.

FIG. 8 illustrates an embodiment that uses serialization with increased time step to meet relative hardware clocking requirements. As shown, the program includes a construct that specifies the relative execution rates for the program code shown with respect to the surrounding code (not shown), in this particular case, a graphical program node labeled "R divided by IQ" (via a "divide" symbol). This node receives loop counter and a constant (3), and outputs a value that controls invocation of the case structure such that it occurs every third iteration of the loop, thus, establishing a ratio of 3:1 or simply 3. Accordingly, the logic (code) within the active true case need only complete every third iteration of the surrounding logic, per the "divide". The user or the compiler may choose to utilize a longer clock period (or slower clock rate) for this logic and still meet the constraints defined by the language. As with overclocking, this clock may be specified by the user explicitly, or implicitly derived by the tool or method to find an optimal solution.

Thus, in some embodiments where the user input further explicitly specifies the clock rate for one of the first code portion or the second code portion, automatically determining a clock rate for at least one of the first code portion or the second code portion may include inferring the clock rate for the other of the first code portion or the second code portion based on the rational ratio.

Figure 9:
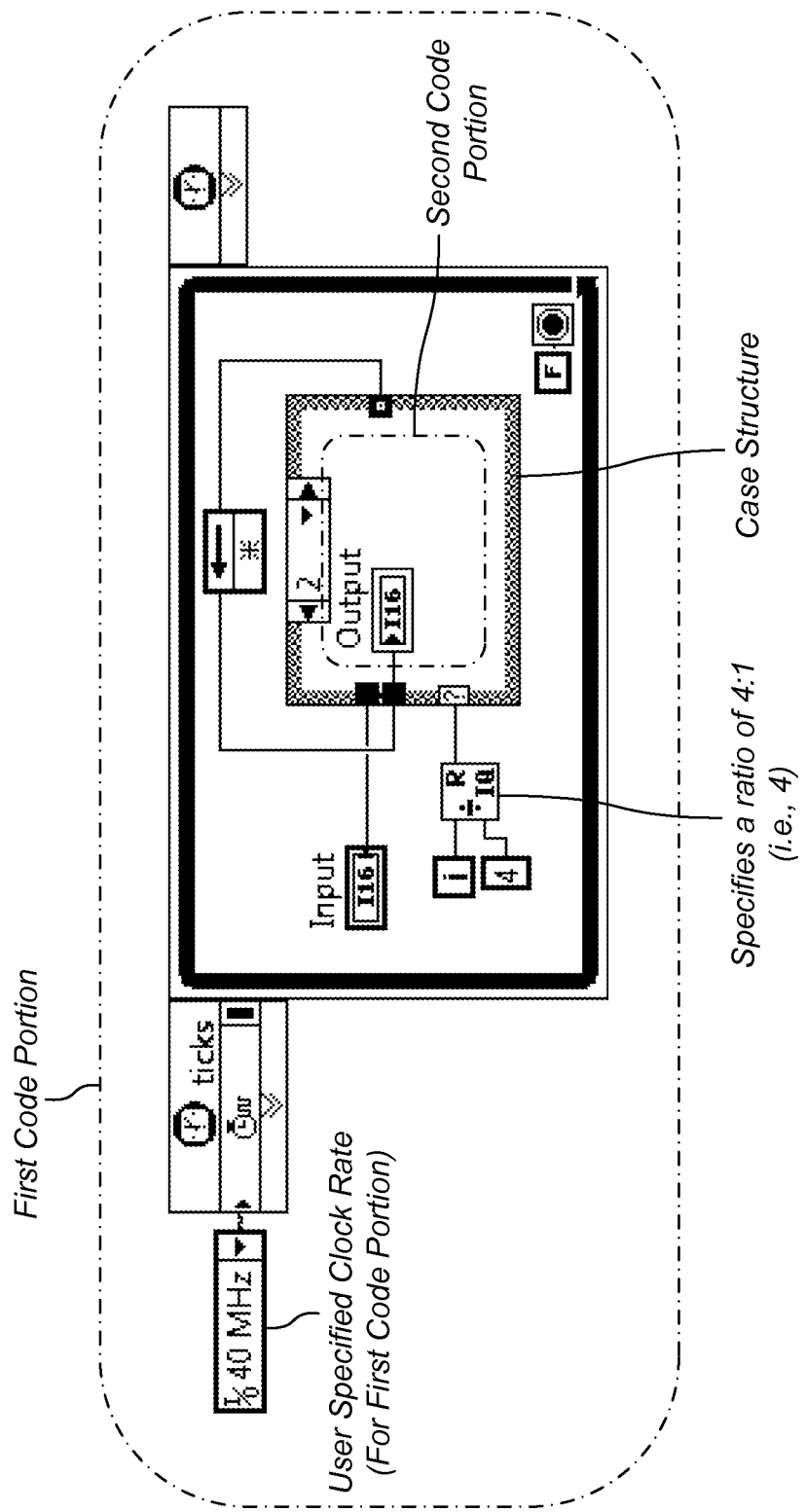
FIG. 9 illustrates an exemplary block diagram with first and second code portions, where the second code portion is contained within a case structure, according to one embodiment.

FIG. 9 illustrates an exemplary graphical program where the second code portion is contained within a case structure, and where, as with the graphical program of FIG. 7, the user has explicitly specified a clock rate for the first code portion of 40 MHz. As FIG. 9 shows, the case structure is itself contained within a loop structure, and (as with FIG. 8) the program further includes the graphical program node labeled "R divided by IQ" (via a "divide" symbol). This node receives loop counter i and a constant (4), and outputs a value that controls invocation of the case structure such that it occurs every fourth iteration of the loop, thus, establishing a ratio of 4:1 or 4. Give the specified clock rate of the first code portion (40 MHz) and this ratio, the method may determine the clock rate of the second code portion, specifically, 40/4, resulting in a clock rate of 10 MHz for the second code portion.

As may be seen in the above cases, in some embodiments, the rational ratio of respective execution rates for the first code portion and the second code portion may be greater than 1. In other words, the second code portion may execute at a lower clock frequency, or higher clock period, than the first code portion, and in some embodiments, the execution rate for the first code portion may be an integer multiple of the execution rate for the second code portion, such as the 4:1 ratio above.

Thus, as shown in FIGS. 7 and 9, in some embodiments, the second code portion may be included within the first code portion, where, for example, the second code portion may include a case structure (see FIG. 9). In another embodiment, a conditional structure may contain the second code portion, e.g., an IF construct (not shown).

In one embodiment, the rational ratio of respective execution rates for the first code portion and the second code portion may be 1. Automatically determining a respective clock rate for at least one of the first code portion or the second code portion may include analyzing the first code portion and the second code portion, determining that the second code portion cannot execute at the same clock rate as the first code portion, and determining a clock rate for the second code portion that implements execution of the second code portion at at least the same execution rate of the first code portion. In other words, a new clock rate for the second code portion may be determined that allows execution of the second code portion at least as quickly as the first code portion.

Similarly, in further embodiments, automatically determining a respective clock rate for at least one of the first code portion or the second code portion may include analyzing the first code portion and the second code portion, determining that the first code portion and the second code portion cannot execute at rates in accordance with the specified rational ratio, and determining a clock rate for the first code portion or second code portion that results in relative execution rates of the first code portion and the second code portion per the specified rational ratio. Said another way, if either or both of the first and second code portions have specified, inherent, or default, execution rates that are incompatible with the specified rational ratio, then one or both of the clock rates may be changed to a value or respective values that are compatible with the specified rational ratio.

As noted above, in some embodiments, the second code portion is included within the first code portion. In various of these embodiments, the first code portion may be or include a structure, such as one or more of a loop structure, a case structure, or a conditional structure, where the second code portion is included within the structure.

The text above explains the simplest forms of rationally related clock rates where the clocks are guaranteed to be aligned when the application begins execution. In many applications, these guarantees cannot be made for various reasons. For example, the two clocks (clock signals) may come from different clocking resources that cannot be guaranteed to start at the same points in time. To successfully implement designs in these scenarios, additional logic may be inferred by the tool (e.g., compiler) to ensure that the application executes within the semantics of the language. However, in some cases explicit help from the user may be required to ensure that the application functions properly.

One way this can be accomplished is by presenting an additional set of control terminals to the user. In some embodiments, these control terminals may be available on the boundaries between code portions operating with different clocks.

Thus, in some embodiments, one of the first code portion or the second code portion may present control terminals that allows the other of the first code portion or the second code portion to determine if the first and second code portions are semantically aligned. For example, in one of these embodiments, the second code portion may be included within the first code portion, where the first code portion is or includes a loop structure with a loop iteration terminal, and where the second code portion is included in the loop structure. A value presented by the loop iteration terminal may be undefined or held at a default value until the control terminals indicate that the logic within the two code portions is semantically aligned, i.e., that both code portions are properly initialized and running (on the hardware). In other words, until both code portions are properly in condition to execute, the data values presented on or by the loop iteration terminal may indicate that they are not both ready to execute in conjunction.

For example, since both code portions are implemented in hardware, the second code portion (that inside the loop) may be "executing" even if the first code portion isn't sending proper input to it (say, because it has not been initialized or invoked with proper parameter values), and so the code portions are not semantically aligned. Thus, the values of the loop iteration terminal may provide an indication as to whether or not both code portions are ready to execute, and the code portions may execute officially only when these values indicate that it is safe to do so. This may help the user create a program that will implement the desired behavior even in cases where the clock resources in the hardware are not able to start execution at the same time.

FIG. 10 illustrates an exemplary graphical program where the second code portion includes such control terminals. As shown, the first code portion includes a (WHILE) loop structure, and the second code portion is contained within the loop structure. The clock rate for the second code portion has been specified (as FPGA clock). As indicated in FIG. 10, the second code portion is further contained within a FOR loop that includes an iteration terminal (a data terminal whose value in each iteration of the loop is the iteration number counting from 0 up), that may be managed by the control terminals. Thus, for example, the control terminals may initialize the loop's data terminal to the initial iteration value, e.g., 0, when, and only when, both the first and second code portions are ready to execute. In the particular example of FIG. 10, the values presented to the user from these terminals are held false on the active code portions until all the code portions have been properly (semantically) aligned. Also, the value of the iteration terminal is held at its default implicitly by the control terminals until all code portions are active.

Figure 11:
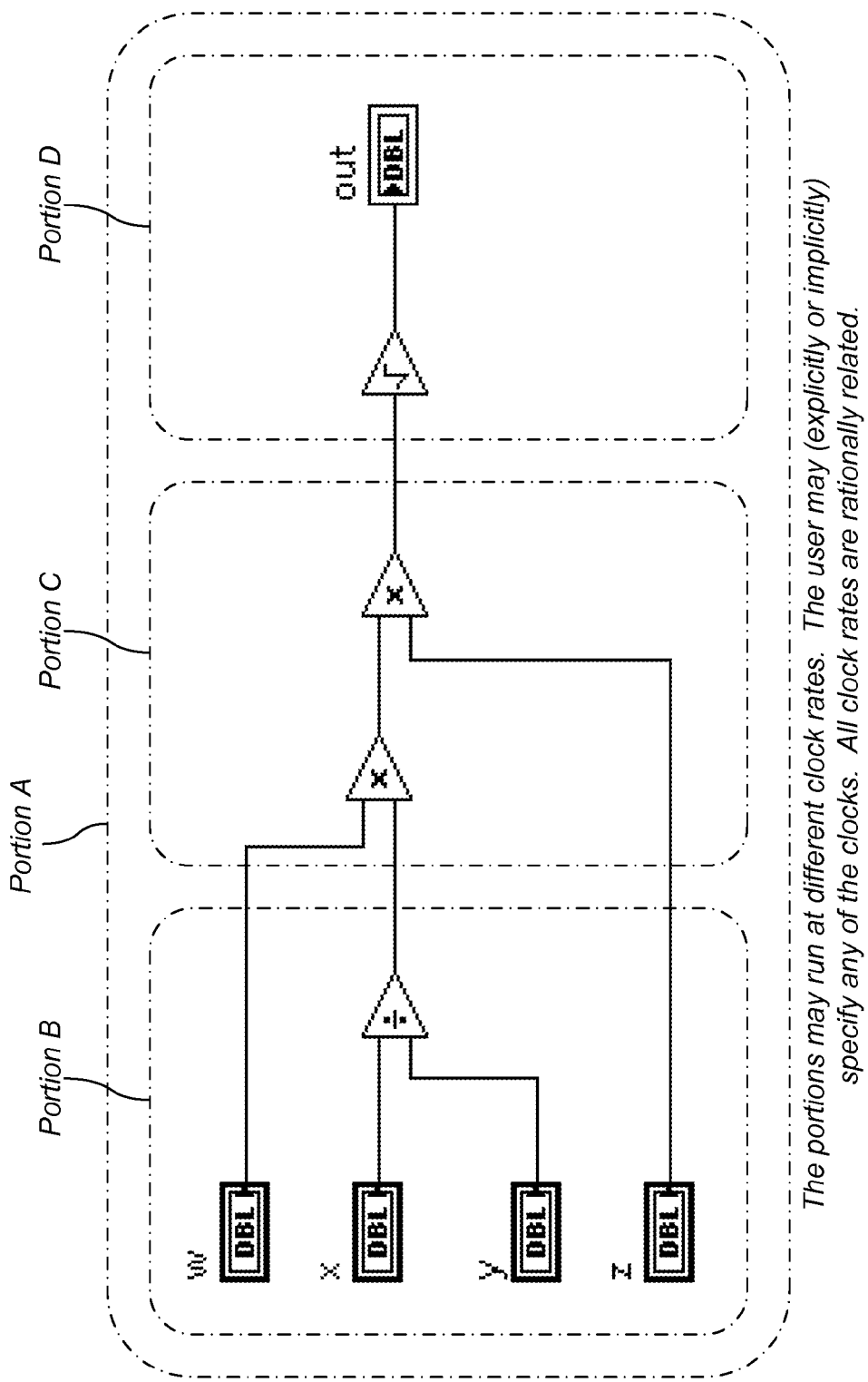
FIG. 11 illustrates an exemplary block diagram that includes four code portions with relative execution rates with rational ratios.

The descriptions and examples above have been limited to very specific cases of overclocking and underclocking. In general, applications may require arbitrarily but rationally related clocks. For instance, a fractional interpolator may take N input tokens and return M output tokens. Optimally, the ratio of the two clock rates would be N/M, thereby allowing for a natural, uninterrupted flow of data between the two clock regions. In some embodiments, the above techniques may be applied to programs with relative hardware clocking among more than two program code portions. FIG. 11 shows an exemplary (very simple) graphical program with four such code portions, A, B, C, and D, chosen by the compiler (or tool). Each of these regions may utilize a different clock rate in order to meet constraints on resource utilizations, latency, etc. For example, portion C may be clocked at twice the rate of portion A, and so the multiplier node (labeled with an "x"), may be shared, freeing up the additional multiplier. However, portion D may be clocked at 4x the clock rate of portion A, and therefore 2x the clock rate of portion C, to complete its operation within the latency or other constraints supplied by the users input.

Thus, the portions may be specified to run at different clock rates (e.g., when deployed to hardware). The user may (explicitly or implicitly) specify any of the clocks, and all of the clock rates may be rationally related, i.e., have respective rational ratios with one another.

Thus, in some embodiments, wherein the program may further include at least one third code portion (per the user input specifying the program), where the first code portion, the second code portion, and the at least one third code portion, are configured to communicate with each other during execution. Moreover, the user input specifying the program may further specify rational ratios of respective execution rates for at least one third code portion with respect to the first code portion and the second code portion.

Accordingly, automatically generating the hardware configuration program implementing the specified program may further include automatically determining a respective clock rate for at least one of the first code portion, the second code portion, or the at least one third code portion based at least in part on the specified rational ratios of respective execution rates for the first code portion, the second code portion, and the at least one third code portion. The hardware configuration program may thus further implement at least one third clock for controlling execution of the at least one third code portion in accordance with the specified rational ratios and the automatically determined respective clock rates for one or more of the at least one of the first code portion or the second code portion, or the at least one third code portion. In other words, the above techniques may be generally applied to programs with any number of code portions with respective relative execution rates that are specified to have respective rational ratios.

In one embodiment, the method may further include deploying the hardware configuration program to the programmable hardware element, thereby implementing the first and second clocks for controlling execution of the first code portion and the second code portion in accordance with the specified rational ratio and the automatically determined respective clock rate for the at least one of the first code portion or the second code portion. For example, the program development environment, and/or a software tool used separately or in conjunction with the program development environment, may compile or otherwise transform or convert the program source code to a hardware configuration program (HCP), possible via one or more intermediate forms, e.g., a data flow intermediate representation (DFIR), other programming languages, etc., as desired. For example, in one embodiment, a graphical program may be created in the LabVIEW FPGA™ development environment, provided by National Instruments Corporation, and a software tool, such as provided by Xilinx Inc., (possibly invoked by or within the environment) may be used to generate the HCP.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a processor to implement:

receiving user input specifying a program, wherein the program is specified for deployment to a programmable hardware element, and wherein the program comprises:
a first code portion; and
a second code portion;
wherein the first code portion and the second code portion are configured to communicate with each other during execution; and
wherein the user input specifying the program further specifies:
a rational ratio of respective execution rates for the first code portion and the second code portion; and
automatically generating a hardware configuration program implementing the specified program, including automatically determining a respective clock rate for at least one of the first code portion or the second code portion based at least in part on the specified rational ratio of respective execution rates for the first code portion and the second code portion;
wherein the hardware configuration program is deployable to the programmable hardware element, including implementing first and second clocks for controlling execution of the first code portion and the second code portion in accordance with the specified rational ratio and the automatically determined respective clock rate for the at least one of the first code portion or the second code portion.

2. The non-transitory computer accessible memory medium of claim 1,
wherein the user input further explicitly specifies the clock rate for one of the first code portion or the second code portion; and
wherein said automatically determining a clock rate for at least one of the first code portion or the second code portion comprises inferring the clock rate for the other of the first code portion or the second code portion based on the rational ratio.

3. The non-transitory computer accessible memory medium of claim 1,
wherein the rational ratio of respective execution rates for the first code portion and the second code portion is less than 1.

4. The non-transitory computer accessible memory medium of claim 3,
wherein the execution rate for the second code portion is an integer multiple of the execution rate for the first code portion.

5. The non-transitory computer accessible memory medium of claim 4,
wherein the second code portion is comprised within the first code portion; and
wherein the first code portion comprises a loop structure, wherein the second code portion is contained within the loop structure, wherein the loop structure is configured to execute the second code portion in an iterative manner, and wherein the loop structure specifies the rational ratio.

6. The non-transitory computer accessible memory medium of claim 5, wherein the user input further specifies a respective clock rate for one of the first code portion or the second code portion, wherein said automatically determining a clock rate for at least one of the first code portion or the second code portion comprises:
determining that the user-specified clock rate is incompatible with loop semantics of the loop; and
determining a respective clock rate for the other of the first code portion or the second code portion, wherein the respective clock rate for the other of the first code portion or the second code portion is compatible with the loop semantics of the loop.

7. The non-transitory computer accessible memory medium of claim 1,
wherein the rational ratio of respective execution rates for the first code portion and the second code portion is greater than 1.

8. The non-transitory computer accessible memory medium of claim 7,
wherein the execution rate for the first code portion is an integer multiple of the execution rate for the second code portion.

9. The non-transitory computer accessible memory medium of claim 8,
wherein the second code portion is comprised within the first code portion; and
wherein the second code portion comprises one or more of:
a case structure; or
a conditional structure.

10. The non-transitory computer accessible memory medium of claim 1,
wherein the rational ratio of respective execution rates for the first code portion and the second code portion is 1; and
wherein said automatically determining a respective clock rate for at least one of the first code portion or the second code portion comprises:
analyzing the first code portion and the second code portion;
determining that the second code portion cannot execute at the same clock rate as the first code portion;
determining a clock rate for the second code portion that implements execution of the second code portion at at least the same execution rate of the first code portion.

11. The non-transitory computer accessible memory medium of claim 1,
wherein said automatically determining a respective clock rate for at least one of the first code portion or the second code portion comprises:
analyzing the first code portion and the second code portion;
determining that the first code portion and the second code portion cannot execute at rates in accordance with the specified rational ratio; and
determining a clock rate for the first code portion or second code portion that results in relative execution rates of the first code portion and the second code portion per the specified rational ratio.

12. The non-transitory computer accessible memory medium of claim 1,
wherein the second code portion is comprised within the first code portion; and
wherein the first code portion comprises a structure, comprising one or more of:
a loop structure;
a case structure; or
a conditional structure; and
wherein the second code portion is comprised within the structure.

13. The non-transitory computer accessible memory medium of claim 1,
wherein one of the first code portion or the second code portion presents control terminals that allows the other of the first code portion or the second code portion to determine if the first and second clocks are aligned.

14. The non-transitory computer accessible memory medium of claim 13,
wherein the second code portion is comprised within the first code portion;
wherein the first code portion comprises a loop structure with a loop iteration terminal;
wherein the second code portion is comprised in the loop structure; and
wherein a value presented by the loop iteration terminal is undefined or held at a default value until the control terminals present the logic within the two code portions is semantically aligned.

15. The non-transitory computer accessible memory medium of claim 1, wherein the program instructions are further executable to implement:
deploying the hardware configuration program to the programmable hardware element, thereby implementing the first and second clocks for controlling execution of the first code portion and the second code portion in accordance with the specified rational ratio and the automatically determined respective clock rate for the at least one of the first code portion or the second code portion.

16. The non-transitory computer accessible memory medium of claim 1,
    wherein the program further comprises at least one third code portion;
    wherein the first code portion, the second code portion, and the at least one third code portion, are configured to communicate with each other during execution; and
    wherein the user input specifying the program further specifies:
        rational ratios of respective execution rates for at least one third code portion with respect to the first code portion and the second code portion; and
    wherein said automatically generating a hardware configuration program implementing the specified program further comprises automatically determining a respective clock rate for at least one of the first code portion, the second code portion, or the at least one third code portion based at least in part on the specified rational ratios of respective execution rates for the first code portion, the second code portion, and the at least one third code portion;
    wherein the hardware configuration program further implements at least one third clock for controlling execution of the at least one third code portion in accordance with the specified rational ratios and the automatically determined respective clock rates for one or more of the at least one of the first code portion or the second code portion, or the at least one third code portion.

17. The non-transitory computer accessible memory medium of claim 1,
    wherein the program comprises a graphical program.

18. The non-transitory computer accessible memory medium of claim 17,
    wherein the graphical program comprises a graphical data flow program.

19. A computer implemented method, comprising:
    utilizing a computer to perform:
        receiving user input specifying the program, wherein the program is specified for deployment to a programmable hardware element, and wherein the program comprises:
            a first code portion; and
            a second code portion;
            wherein the first code portion and the second code portion are configured to communicate with each other during execution; and
            wherein the user input specifying the program further specifies:
                a rational ratio of respective execution rates for the first code portion and the second code portion; and
        automatically generating a hardware configuration program implementing the specified program, including automatically determining a respective clock rate for at least one of the first code portion or the second code portion based at least in part on the specified rational ratio of respective execution rates for the first code portion and the second code portion;
        wherein the hardware configuration program is deployable to the programmable hardware element, including implementing first and second clocks for controlling execution of the first code portion and the second code portion in accordance with the specified rational ratio and the automatically determined respective clock rate for the at least one of the first code portion or the second code portion.

20. A system, comprising:
    a processor; and
    a memory medium, coupled to the processor;
    wherein the memory medium comprises program instructions executable by the processor to:
        receive user input specifying the program, wherein the program is specified for deployment to a programmable hardware element, and wherein the program comprises:
            a first code portion; and
            a second code portion;
            wherein the first code portion and the second code portion are configured to communicate with each other during execution; and
            wherein the user input specifying the program further specifies:
                a rational ratio of respective execution rates for the first code portion and the second code portion; and
        automatically generate a hardware configuration program implementing the specified program, including automatically determining a respective clock rate for at least one of the first code portion or the second code portion based at least in part on the specified rational ratio of respective execution rates for the first code portion and the second code portion;
        wherein the hardware configuration program is deployable to the programmable hardware element, including implementing first and second clocks for controlling execution of the first code portion and the second code portion in accordance with the specified rational ratio and the automatically determined respective clock rate for the at least one of the first code portion or the second code portion.

* * * * *